United States Patent [19]
Wohlmut et al.

[11] 3,848,095
[45] Nov. 12, 1974

[54] THREE DIMENSIONAL ELECTRO-OPTICAL RETRIEVAL SYSTEM

[75] Inventors: Peter G. Wohlmut, Palo Alto; Frank D. Neu, Castro Valley, both of Calif.

[73] Assignee: I/O Metrics Corporation, Sunnyvale, Calif.

[22] Filed: Dec. 20, 1972

[21] Appl. No.: 316,661

[52] U.S. Cl. . 179/100.3 V, 178/6.7 A, 250/219 DD
[51] Int. Cl. ........................ G11b 7/08, G11b 21/10
[58] Field of Search ............. 179/100.3 V, 100.3 B; 178/6.7 A, DIG. 29; 250/219 Q, 219 QA, 219 FT, 219 D, 219 DD, 219 FR

[56] References Cited

UNITED STATES PATENTS

| | | | |
|---|---|---|---|
| 3,518,442 | 6/1970 | Johnson | 179/100.3 V |
| 3,673,412 | 6/1972 | Olson | 179/100.3 V |
| 3,715,524 | 2/1973 | Adler | 179/100.3 V |

*Primary Examiner*—Stanley M. Urynowicz, Jr.
*Attorney, Agent, or Firm*—Lyon & Lyon

[57] ABSTRACT

A system for sensing information located in tracks in various layers of a multi-layered recording media. The desired information is electro-optically tracked in three dimensions to provide a sensing of the information contained in the multi-layered recording media.

20 Claims, 16 Drawing Figures

PATENTED NOV 12 1974

3,848,095

SHEET 2 OF 3

THREE DIMENSIONAL ELECTRO-OPTICAL RETRIEVAL SYSTEM

BACKGROUND OF THE INVENTION

This invention relates to electro-optical systems which track information on a multi-layered recording media to provide an output of the information contained in the recording media. More particularly, the system relates to the continuous playback of audio/video information for home and professional use. This system is especially compatible with individual home black and white, or color television sets, utilizing the sets to continuously display the information contained in the multi-layered recording media.

Electro-optical technology which records and retrieves information on two dimensional recording media, such as conventional film or rotating discs, is well known in the art. However, many prior art electro-optical devices which deal with high density or high frequency information are hampered by the problems of the accuracy of placement of a pick up head, or the like, and syncronizing different types of information. Further, to achieve electro-optically a continuous playback with accuracy for a substantial length of time, a great amount of two dimensional recording media is required.

By recording information in an electro-optical form in two dimensions on a medium, in any of a number of conventional manners, and by stacking the resulting recordings, it will be apparent that storage density will dramatically increase if a reliable electro-optical system for retrieving this information can be provided.

Assuming that the recording medium used is a conventional rotating plate which consists of discs stacked one on top of the other, it is apparent that the recording density on any disc need not be as great (e.g., for a stack of five discs it may be approximately five times less) as in present systems. With a plurality of tracks recorded on each disc, in any form such as digital or analog, an electro-optical unit can be provided as described herein which can electro-optically track and electro-optically sense each and every layer and follow any desired track thereupon to achieve sensing and playback, or retrievel, of the information. This information may be discretely retrieved from a particular location in the multi-layered media or may be continuously retrieved from each and every layer of the media.

The ability to select a layer from which information is to be retrieved allows the first information layer to be located below the surface of the plates thus making the system insensitive to dirt located on the surface of the plate.

Thus the electro-optical retrieval of information, especially continuously, in a stack of two dimensional recording media will provide a reasonable playing time in a relatively small volume of the recording media.

By the practice of this invention, information may be continuously retrieved in a reasonable playing time and in three dimensions with a high degree of accuracy.

The advantages inherent in a three dimensional electro-optical retrieval system may be realized by providing in a preferred embodiment of this invention a multi-layered recording media which contains information sensed by a sensing electro-optical system which is electro-optically positioned and focused on the desired information. A tracking electro-optical system tracks the desired information located in the recording media in the lateral and normal (or depth) directions, and thereby controls the positioning and focusing of the sensing system on the desired information. Tracking in the third dimension on a given track is achieved by the desired track passing the tracking and sensing electro-optical systems or by both electro-optical systems scanning to compensate for the relative motion between the systems and the desired track.

SUMMARY OF THE INVENTION

It is an object of this invention to provide electro-optical track following in three dimensions.

It is also an object of this invention to provide a system for electro-optically retrieving information in three dimensions.

It is another object of this invention to provide an accurate electro-optical retrieval system for continuously tracking and sensing information from a multi-layered recording media.

It is further object of this invention to achieve an electro-optical retrieval system which results in a reasonable playing time with a relatively small volume of recording media.

It is still a further object of this invention to provide an electro-optical retrieval system to track and sense desired information in radial and normal directions in a multi-layered recording media.

BRIEF DESCRIPTION OF THE DRAWINGS

The invention both as to its organization and principles of operation together with further objects and advantages thereof may better be understood by referring to the following detail description of an embodiment of the invention when taken in conjunction with the accompanying drawings in which.

DESCRIPTION OF THE PREFERRED EMBODIMENT

Figure 1:
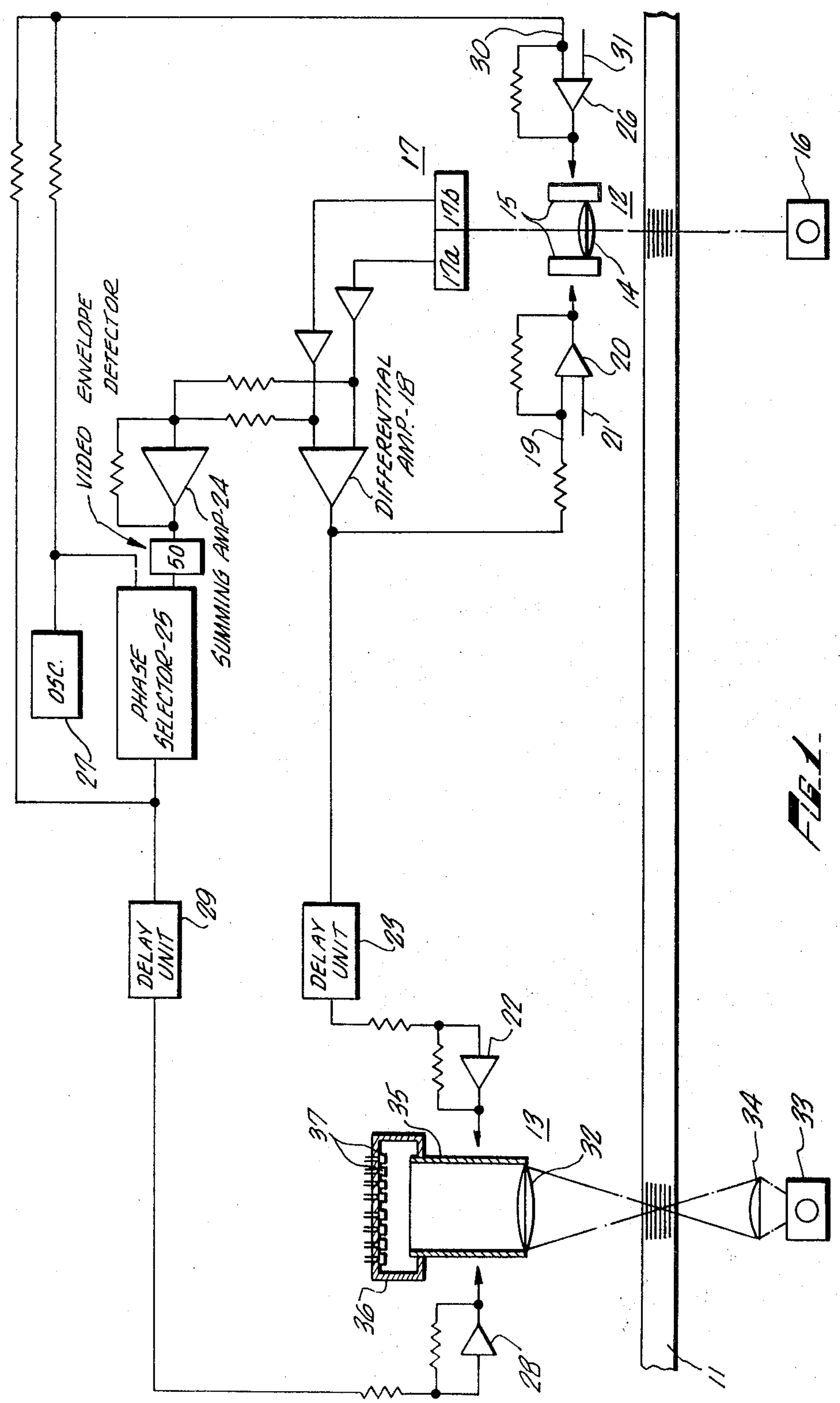
FIG. 1 is a block diagram illustrating an exemplary embodiment of the basic concepts of a three dimensional electro-optical retrieval system for a multi-layered recording media in accordance with this invention.

Referring now to FIG. 1, a multi-layered recording media or plate 11 in the form of a plurality of discs (only a small segment of which is shown) is illustrated to contain tracks of information on a plurality of its layers. In this embodiment, plate 11 is capable of being driven so that the desired information will pass a first adjustable electro-optical system 12 at a first time and pass a second adjustable electro-optical system 13 a predetermined time thereafter. Electro-optical system 12 follows an information track on a given layer or disc of plate 11, and controls positioning of the electro-optical system 13 which retrieves information.

Electro-optical system 12 is utilized to electro-optically focus and track the desired information in the lateral and normal or depth directions and includes a lens 14 which is adjustable in the lateral and normal directions by control apparatus 15. The lens 14 has a generally short focal length, i.e., a fraction of a centimeter, and a large enough numerical aperture to provide a depth of field less than the separation of the layers of plate 11. Control apparatus 15 may be of any readily available design such as the type utilizing speaker type coils in a permanent magnetic field to electromagnetically change the position of the lens 14 to a selected focal plane.

A light source 16 positioned beneath the plate 11 in the first electro-optical system 12 emits light through the general area of the desired information on plate 11 through lens 14, or other focusing equipment, to a light responsive unit such as a photosensor or split photodetector 17. A split photodetector 17 is utilized in a preferred embodiment but its equivalents, such as a pair of positioned light responsive resistors, semi-conductors, photomultipliers, or the like, will suffice.

The split photodetector 17 comprises halves 17*a* and 17*b*. Each halve provides an output signal representative of the amount of light impinging upon its surface from the light source 16 as the desired information in disc 11 moves past the photodetector 17. The outputs of the split photodetector 17 are connected, through amplifiers, as inputs to a differential amplifier 18 which in turn is connected through its output to a first input of a servo amplifier 20. The output of differential amplifier 18 is also connected to a servo amplifier 22, through a delay unit 23, to position the second electro-optical system 13 in the lateral direction after a predetermined time delay as will be described subsequently. Servo amplifier 20 which controls the lateral positioning of the lens 14 through control apparatus 15, is also provided with a second input 21 to allow a coarse setting of the control apparatus 15 and thus a coarse positioning of the first electro-optical system 12 in the lateral direction.

Lateral positioning of the first electro-optical system 12 and the second electro-optical system 13 (after a delay) is thus achieved by the relative amount of light striking halves 17*a* and 17*b* of split photodetector 17. Due to the positioning of the split photodetector 17, halves 17*a* and 17*b* receive the same amount of light when the first electro-optical system is properly positioned (i.e., straddling the information track) on the desired information. When equal amounts of light strike halves 17*a* and 17*b*, the output of the differential amplifier 18 will be zero, and thus no signal is provided to the input 19 of servo amplifier 20 and the position of lens 14 as controlled by apparatus 15 is unaltered.

When halves 17*a* and 17*b* receive different amounts of light from light source 16, the input signals to the differential amplifier 18 likewise will be different. When this occurs, an output signal from the differential amplifier 18 will command, through servo amplifier 20, a correction of lens 14 in the appropriate lateral direction.

FIG. 1 is illustrative of a two head system in accordance with this invention, i.e., a first electro-optical system 12 and a second electro-optical system 13. In the disclosed embodiment the first electro-optical system 12 is utilized to track in the lateral and in the normal directions. From this disclosure it is deemed evident that a three head system could be realized by providing separate electro-optical systems for the lateral tracking function and the normal tracking function of the first electro-optical system 12 and for the sensing function of the second electro-optical system 13.

Having described the lateral tracking function of the first electro-optical system 12, the normal or depth tracking function of electro-optical system 12 will be discussed. The depth or normal tracking function of the first electro-optical system 12 utilizes lens 14, control apparatus 15, split photodetector 17, summing amplifier 24, video envelope detector 50, phase detector 25, servo amplifier 26 and oscillator 27. The outputs from halves 17*a* and 17*b* of split photodetector 17 are further connected through amplifiers, as inputs to the summing amplifier 24. The output of summing amplifier 24 is connected through the video envelope detector 50 to a first input to the phase detector 25. The output of phase detector 25 is connected to a servo amplifier 28 in the second electro-optical system 13 through a delay unit 29 and to a first input 30 of the servo amplifier 26 in the first electro-optical system 12. A second input 31 of servo amplifier 26 is provided to allow a coarse setting to be made of the control apparatus 15 in the normal direction.

Oscillator 27 provides a dither signal of a predetermined frequency such as 100 to 120 hertz to a second input of phase detector 25 and to the first input 30 of servo amplifier 26. The dither signal from the oscillator 27 applied to the first electro-optical system 12 causes the lens 14 to vibrate in the normal or depth direction at a frequency determined by the output of the oscillator 27.

The output of the phase detector 25 is applied to the first input 30 of servo amplifier 26 to ultimately retain the lens 14 at an average position (in the normal direction) to focus on the desired information. The phase detector 25 will not provide an output signal when the first electro-optical system 12 is focused at this average position in the normal direction and thus, the dither signal produced by oscillator 27 is free to alone cause equal excursions in the normal or depth direction of lens 14 through a true focus to the high and low focus, as will be explained in discussing FIGS. 6*a* through 6*e*.

The movement of the plate 11 in the desired track direction (or the scanning by the electro-optical systems 12 and 13 because of relative motion between the systems and the disc) and the positioning of the first electro-optical system 12 in the lateral and normal directions allow the second electro-optical system 13 to focus upon any desired information location and follow its track continuously.

The second adjustable electro-optical system 13, which finally senses the desired information for retrieval thereof is, in effect, positioned and focused on the desired information in response to the first electro-optical system 12 after a predetermined time delay. Electro-optical system 13 is utilized to electro-optically focus on and sense the desired information, and includes a lens 32 similar to lens 14, a second light source 33, a condenser lens 34, a housing 35, and a cap structure 36. The cap structure 36 may be a screw-on cap, and contains a plurality of photosensors, such as light responsive diodes 37, therein.

Light from source 33 is focused generally by a condenser lens 34 on the desired information. The light, after being partially attenuated by the desired information, is focused through lens 32 and travels through the housing 35 to be received by the light responsive diodes 37 in the cap structure 36.

Servo amplifier 28 controls the positioning in a normal direction of the second electro-optical system 13 by electromagnetically varying the position of the lens 32, or alternatively by changing the position of the diodes 37 to the correct focal plane by moving the cap 36 up and down with respect to the housing 35. Alternatively, the diodes 37 could be mounted in a diode holder or base (not shown), which is in turn connected to the cap 36. By moving the diode holder (not the whole cap) the diodes 37 could be moved in the focal plane thereby resulting in a light weight system.

The predetermined delay provided is the time it takes the information focused at a first time in the first electro-optical system 12 to travel to the second electro-optical system 13 and is provided by delay units 23 and 29. In the embodiment wherein the electro-optical systems 12 and 13 both are moved to scan in the desired track direction, this time is the period necessary for the second electro-optical system 13 to reach the desired information after the first electro-optical system 12 focused thereon.

In operation, the first electro-optical system 12 is positioned to track the desired information in the lateral direction by the described circuitry and electro-optical equipment which attempts to center laterally the desired track. More specifically, when the track is centered properly, the light from source 16 falls equally on both halves 17a and 17b of the split photodetector 17 by the lens 14. When the light on half 17a and half 17b of split photodetector 17 is not equal, differential amplifier 18, through servo amplifier 19, will adjust the lateral position of the lens 14 through control apparatus 15 until both input signals from split photodetector 17 in differential amplifier 18 are equal. The action is a conventional servo action and will provide a proper input signal to servo amplifier 20 representative of the fact that the first electro-optical system 12 is properly centered in the lateral direction.

The first electro-optical system 12 also is positioned to track the desired information in the normal (or vertical as viewed in FIG. 1) direction, on the average. This is accomplished through the previous described circuitry and electro-optical equipment which in part, may be common with the lateral tracking function of the first electro-optical system 12. More particularly, the output of the phase detector 25 is applied to the servo amplifier 26 in such a manner to retain the lens 14 in focus (on the average) on the desired track. This is accomplished by comparing in the phase detector 25 the output signal from the video envelope detector 50 with the dither signal from the oscillator 27 (as explained in more detail in conjunction with FIGS. 6a through 6e) and allowing the dither signal to cause equal excursions in the normal direction of lens 14 when average focus in the normal direction is achieved.

After a predetermined delay provided by delay units 23 and 29, the second electro-optical system 13 is positioned and focused in response to the position of the first electro-optical system 12 to sense the desired information either discretely or continuously. This three dimensional electro-optical retrieval system will thereby reduce the absolute centering requirements and the flatness requirements of the layers of recording media sandwiched together to form a multi-layered disc.

Figure 2:
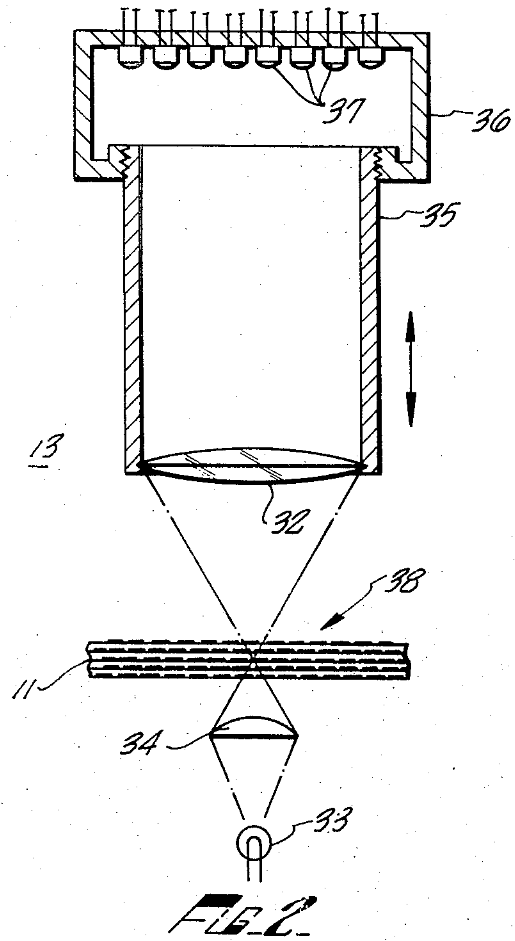
FIG. 2 is a diagram illustrating an embodiment of an electro-optical head utilized to sense information on a multi-layered recording media in accordance with this invention.

FIG. 2 illustrates in greater detail a portion of the second electro-optical system 13. In this embodiment, the second light source 33 is focused through a condenser lens 34 and the plate 11 (only a small segment of which is shown). Plate 11 comprises a plurality of layers with some of the layers containing information 38 as will be explained subsequently in discussing FIGS. 7a, 7b and 7c. The light passed through the plate 11 is focused by the lens 32 through the housing 35 onto diodes 37 contained in the cap structure 36. The adjustability of this second electro-optical system 13 is accomplished through adjusting the lens 32 and/or adjusting the distance lens 32 to the diodes 37.

Figure 7A:
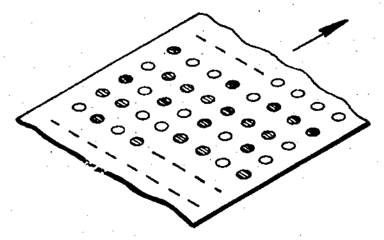
FIG. 7*a* illustrates a track of a recording medium with binary representation thereon.

In operation, the light source 33 is focused through the condenser lens 34 and the lens 32 onto the disc layers. This enables the diodes 37 to receive light indicative of the desired information on a particular layer. In FIG. 2, eight diodes are illustrated as being representative of photosensors which sense binary information contained on the plate 11. For example, each layer of plate 11 may have a continuous information track which comprises a series of rows of binary coded spots, each row being eight bits wide as shown in FIG. 7a which will be described later. Although eight diodes are illustrated, the number and type of photosensors used is a matter of choice dictated by convenience and the type of information to be retrieved; for example, light sensitive integrated circuits (of the "bucket brigade" type) may be used. It is believed apparent that different types of photosensors may readily be matched with the type of recorded information utilized.

Further circuitry, which is well known in the art, may be added to the second electro-optical system 13 to increase the accuracy of the system as described. For example, such circuitry could compensate for nonlinearities (such as subtracting the gray background, compensating for disc speed variations, etc.) or insure that the photosensors are properly retrieving the recorded information.

Figure 3:
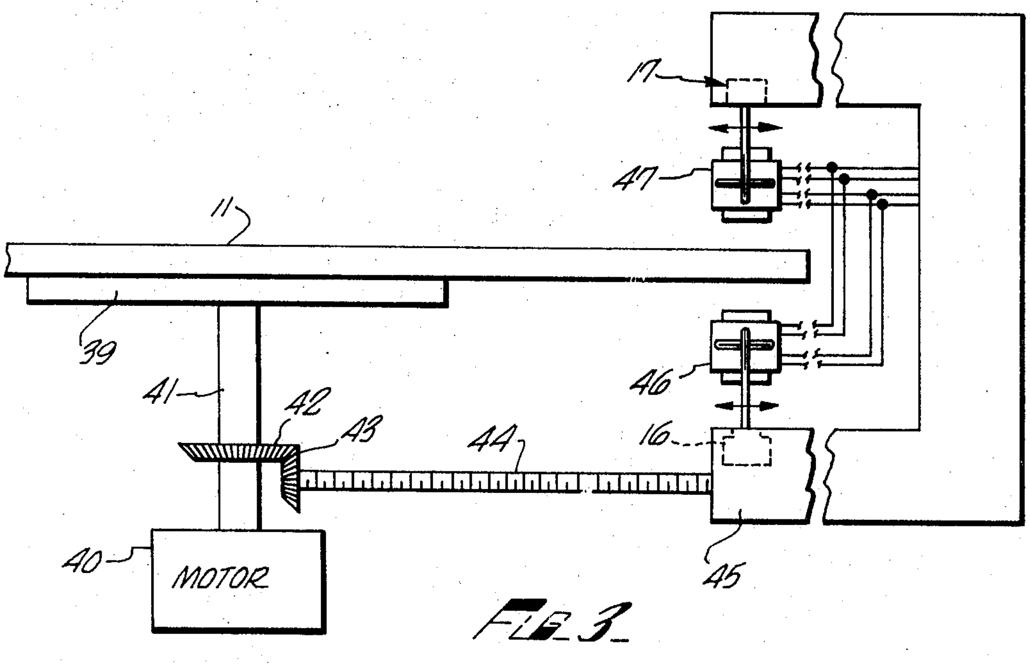
FIG. 3 is a side view of a two head system in accordance with this invention.

FIG. 3 illustrates a side view of a two head system in combination with a section of a multi-layered recording media in the form of plate 11. Plate 11 is positioned on a turntable 39 which is driven by a motor 40 through a drive shaft 41. The drive shaft 41 has included thereon a gear member 42 which engages a coupling gear 43 to provide coarse following in the lateral direction through a mechanical linkage or lead screw 44.

The other end of the lead screw 44 is connected to an outer casing 45 of the electro-optical system.

In the casing 45, the split photodetector 17 is located above the plate 11, and the light source 16 is located below the plate 11. Control units 46 and 47, which are positioned below and above the plate 11 respectively, contain electrical and optical equipment capable of following the desired track in the lateral and normal directions, as previously described.

Figure 4:
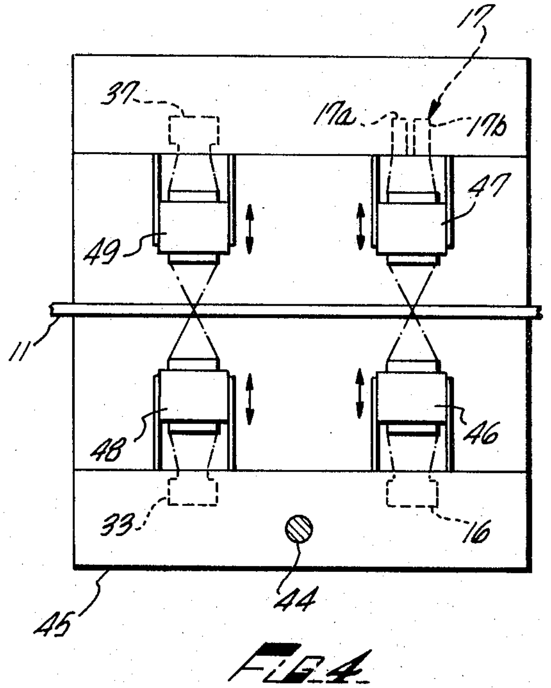
FIG. 4 is a front view of the two head system of FIG. 3 in accordance with this invention.

FIG. 4 illustrates a front view of the two head system of FIG. 3, including the photosensor 37 and the split photodetector 17 located above a section of the plate 11, in casing 45. The light from light source 33 in casing 45 is directed through a lower control units 48, the plate 11, and an upper control unit 49. The control units 48 and 49 are representative of electrical and optical equipment which properly focuses on the desired information with respect to the photosensor 37. Likewise, the light from light source 16 in casing 45 is transmitted through control unit 46, plate 11 and control unit 47 to focus on the desired information with respect to the split photodetector 17.

Figures 5A, 5B, 5C:
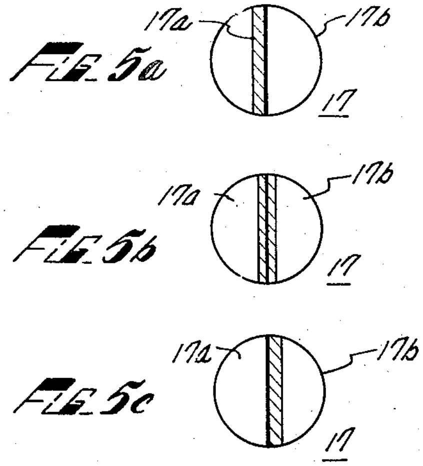
FIGS. 5*a*, 5*b*, and 5*c* are representations of the light pattern on a split photodetector in accordance with this invention.

FIG. 5a illustrates a light pattern formed only on half 17a of the split photodetector 17. This pattern indicates that a correction in the lateral direction of the first electro-optical system 12 is required.

FIG. 5b illustrates a light pattern on split photodetector 17 in which the same amount of light impinges on both halves 17a and 17b. This pattern requires no correction since the desired information is properly being tracked, that is centered, in the lateral direction. Thus, when the desired track is centered equally in the lateral direction, both halves 17a and 17b of photodetector 17 receive the same amount of light.

FIG. 5c illustrates a light pattern formed only on half 17b of split photodetector 17. This pattern indicates that an adjustment of the first electro-optical system 12 in the lateral direction is required. The direction of the lateral adjustment for FIG. 5c will be in the opposite direction as that required in FIG. 5a.

The light patterns of FIGS. 5a, 5b, and 5c are illustrated as being of equal intensity, i.e., without taking into consideration the depth or normal direction focusing.

Figures 6A, 6B, 6C, 6D, 6E:
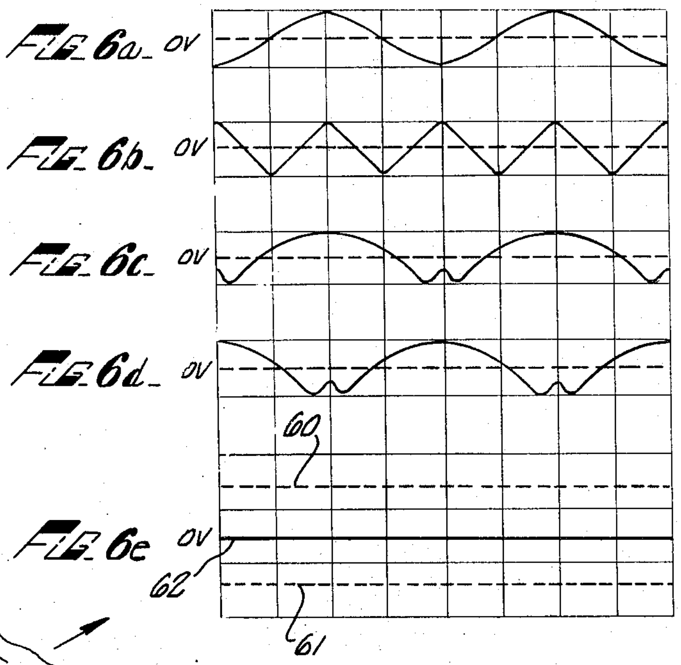
FIGS. 6*a*, 6*b*, 6*c*, 6*d*, and 6*e* are illustrations of various waveforms which occur in the electro-optical retrieval system in accordance with this invention.

The waveforms of FIG. 6a–6e illustrate the operation of tracking in the normal or depth direction of the first system 12. The waveform of FIG. 6a illustrates the dither signal, produced by the oscillator 27, which exclusively causes the first electro-optical system 12 to vibrate in the normal or depth direction when the desired information is in focus in the normal or depth direction, on average. The waveform of FIG. 6a is also fed to an input of the phase detector 25, as was previously mentioned.

The waveform of FIG. 6b illustrates the output of the video envelope detector 50 when the first electro-optical system 12, or more specifically lens 14, is properly focused in the normal or depth direction on the average. This is achieved when the desired layer of information is, on the average, between the high and low focus points of the vibrating lens 14.

The waveform of FIG. 6c illustrates the output of the video envelope detector 50 when the lens 14 is out of focus in the normal direction, too high on the average.

The waveform of FIG. 6d illustrates the output of the video envelope detector 50 when the lens 14 is out of focus in the normal direction, too low on the average.

The phase detector 25 receives two input waveforms, the waveform or dither signal, of FIG. 6a from oscillator 27 and one of the waveforms of FIG. 6b, 6c, or 6d. When the phase detector 25 receives the waveform of FIG. 6a and the waveform of FIG. 6c, indicative of lens 14 being focused too high on the average, the phase detector 25 will generate, as an output signal, waveform 60 of FIG. 6e. The waveform 60 of FIG. 6e is transmitted to input 30 of the servo amplifier 20 to cause lens 14 to focus lower.

When the phase detector 25 receives the waveform of FIG. 6a and the waveform of FIG. 6d, indicative of lens 14 being focused too low on the average, the phase detector 25 will generate, as an outut signal, waveform 61 of FIG. 6e. The waveform 61 of FIG. 6e is transmitted to input 30 of the servo amplifier 26 to cause lens 14 to focus higher.

When the phase detector 25 receives the waveform of FIG. 6a and the waveform of FIG. 6b, indicative of lens 14 being in focus in the normal direction on the average, the phase detector 25 will not generate an output, as represented by the zero volt waveform 62 of FIG. 6e.

Thus the output of the phase detector 25 ultimately effects the positioning of lens 14, in its normal or depth tracking mode, to retain the average position of the lens 14 focused on the desired layer. When proper focus is reached, the dither signal causes equal excursions of the lens 14 through true focus, to high and low focus.

Figures 7B, 7C:
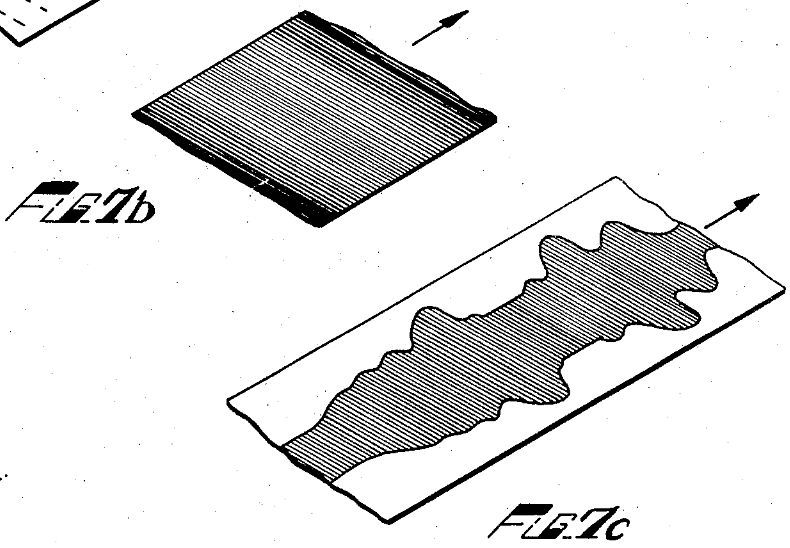
FIG. 7*b* illustrates a track of a recording medium with a series of varying density bands thereon.
FIG. 7*c* illustrates a track of a recording medium with varying width opaque line therein, all in accordance with this invention.

FIG. 7a illustrates a single track of information including a series of eight binary information bits. Information is retrieved from the track of FIG. 7a by diodes which respond to discrete binary codes with the outputs of the diodes connected by a digital-to-analog converter to produce video signals. FIG. 7b illustrates a single track of information including a series of varying density bars, such as bars of approximately 50 different densities. Information is retrieved from the track of FIG. 7b by diodes or an elongated sensor which provides an analog output proportional to density of each bar 7c, but effecting the amplitude of the lines. FIG. 7c illustrates a single track of information including a varying width opaque line. In FIG. 7c, the information is retrieved like in FIG. 7b. FIGS. 7a, 7b and 7c are not exhaustive of the types of information which readily recorded on each layer of a multi-layered recording media. Also, the first video line (i.e., top TV raster scan line) may be coded in a manner to distinguish the same. A signal representing this line can be used to identify each TV field or frame and correct the track's system in the event the latter deviates from the proper track. Likewise, a coded signal at horizontal retrace time can be used to cause the electro-optical system to switch from one track to the next.

It is believed apparent that the recording of information on different layers of a multi-layered media may require the recorded information to be variable densities which will be electro-optically distinguishable, but which will not prevent light from a source reaching the appropriate photosensors. There are presently available over 50 different densities which may be utilized in the practice of this invention.

Figure 8:
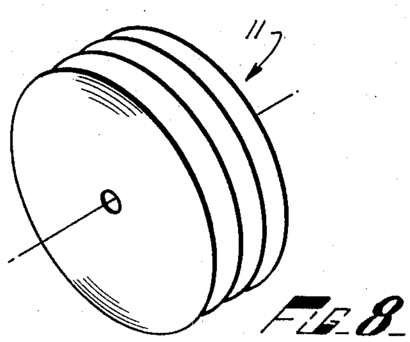
FIG. 8 illustrates an embodiment of a multi-layered recording media in disc form, in accordance with this invention.

FIG. 8 illustrates a plurality of layers in the form of thin discs, (for example 10), each individual disc being constructed of a plastic or the like to comprise the plate 11. For example, each layer may be made from a thin mylar based emulsion film. A master is recorded, and copies are printed therefrom. The individual layers then are glued together with a clear adhesive. The glue may cause variations in the thickness between the layers, but in a preferred embodiment of this invention, the normal or depth tracking system operates on an average, thereby taking into consideration variations in thickness in the normal or depth direction.

It is considered apparent that the recording media need not be in the shape of a disc, but may be cylindrical, or the like, since the optical systems used herein may travel in the track direction of the recording media.

In the embodiment of FIG. 8, the disc radius is approximately seven inches and the thickness of each disc is approximately 0.025 inches. Each track is approximately 20 microns wide, a stack of 10 discs has a total thickness of approximately 0.25 inches; howevere, upper and lower cover discs and/or a metal rim can be used to enable better support. Using 5,000 convolutions (forming one continuous track as in a phonograph record, or 5,000 separate tracks) per disc, and 1/30th of a second to scan each convolution track, approximately 30 minutes playing time for color video can be provided (which utilizes a 4 megahertz bandwith) and 60 minutes playing time for black and white video (which utilizes a 2 megahertz bandwith). A lineal speed of approximately 15 meters per second appears to be the maximum required.

Each layer typically has a single track in the form of convolutions as noted above. When the end of the track on one layer is reached, a recorded coded signal causes the electro-optical system to focus on the track of the next layer. This coded signal could be in the form of a step change in voltage to achieve coarse correction through a servo amplifier. Typically a layer change (which takes about 12 to 18 milliseconds) occurs every 3 minutes in a color recording. The layer change could be accomplished by allowing the program to have a "fade out" or use other type of pictures, known in the art, to reduce the short flicker of the change. Alternatively, the electronics could replay the last view a second time. Also, two separate playback systems could be placed on opposite sides of the plates with each system focused on a different layer, and electronically alternately switched on at the end of each layer. A layer change would then take only a few microseconds.

This same type of spiral track can be recorded on a drum, or on a web (like a film strip) which is stored in a cassett-type package. A drum, or cylinder, recording media may be formed by recording on a continuous sheet or strip, and then winding this into a cylindrical form.

By providing an electro-optical system capable of accurately tracking desired information in three dimensions, information may be sensed and retrieved in a multi-layered recording media thereby achieving a reasonable playing time with a relatively small volume of recording media.

Track direction following is achieved by the movement of the recording media past the electro-optical systems, or the electro-optical systems traveling in the direction of the track. Lateral or radial tracking is accomplished by utilizing a split photodetector and a differential amplifier to correct the lateral position of a lens. Depth or normal tracking is accomplished by vibrating a lens in the normal direction and comparing the total amount of light sensed by a split photodetector with a dither signal from an oscillator to correct the position of a lens in the normal direction.

While embodiments and applications of this invention have been shown and described, it will be apparent to those skilled in the art that many more modifications are possible without departing from the inventive concepts herein described. The invention, therefore, is not to be restricted except as is necessary by the prior art and by the spirit of the appended claims.

What is claimed as new and desired to be secured by Letters Patent of the United States is:

1. A three dimensional electro-optical retrieval system for retrieval of information from any one of a plurality of layers of a recording media comprising;

means for receiving a multi-layered recording media having information on a track on at least one of a plurality of layers;

a first adjustable electro-optical system;

first means for electro-optically positioning said first adjustable electro-optical system relative to the lateral and normal locations of the desired information;

a second adjustable electro-optical system;

second means for electro-optically positioning said second adjustable electro-optical system, after a predetermined delay, relative to the lateral and normal locations of the desired information in response to said first means, said second adjustable electro-optical system capable of electro-optically sensing the desired information; and means for driving the desired information location of the recording media in the desired track direction past said first adjustable electro-optical system at a first time and past said second adjustable electro-optical system the predetermined delay after the first time.

2. The system as in claim 1 wherein said first means for electro-optically positioning said first electro-optical system includes means for tracking in the lateral direction and the desired track and means for tracking in the normal direction the desired track.

3. The system as in claim 2 wherein said means for tracking in the normal direction the desired track includes a split photodetector having a first and second output, a summing amplifier, a video envelope detector, said first and second outputs of said split photodetector connected to inputs to said summing amplifier, on output of said summing amplifier connected to an input of said video envelope detector, an oscillator and a phase detector, said oscillator driving said first adjustable electro-optical system in the normal direction at a predetermined frequency, said oscillator connected to a first input to said phase detector connected to a second input of said phase detector, said phase detector producing a zero output when said second adjustable electro-optical system is in focus in the normal direction on the average.

4. The system as in claim 2 wherein said means for tracking in the lateral direction the desired track including a light responsive unit, the output of which controls said laterally tracking means, said light responsive unit producing a zero output when the desired information is in the desired lateral location.

5. The system as in claim 4 wherein said light responsive unit comprises a split photodetector having a first and a second output, and a differential amplifier, the first and second output of said split photodetector being connected as inputs to said differential amplifier, the output of said differential amplifier controlling the lateral position of said first adjustable electro-optical system.

6. The system as in claim 5 wherein the output of said differential amplifier is further connected through a delay unit to said second adjustable electro-optical system.

7. The system as in claim 1 wherein said second adjustable electro-optical system includes an electro-optical focusing system.

8. The system as in claim 1 wherein the multi-layered recording media comprises a plurality of discs.

9. The system as in claim 1 wherein said second adjustable electro-optical system includes a housing and a suitable lens capable of focusing on the desired information, and a cap having a plurality of light responsive diodes therein for sensing the desired information.

10. The system as in claim 1 wherein said second adjustable electro-optical system is capable of electro-optically retrieving the desired information.

11. The system as in claim 1 wherein said first and said second means continuously electro-optically position said first and second electro-optical systems respectively.

12. The system as in claim 1 wherein the desired information includes high frequency information.

13. The system as in claim 12 further including a lens and a source of radiation for providing radiation through the general area of the desired information thereby providing a data plane object to said lens.

14. The system as in claim 1 wherein the desired information includes video information.

15. The system as in claim 1 wherein the recording media has information on more than two layers.

16. The system as in claim 1 wherein the desired information includes digital information.

17. A three dimensional electro-optical system for retrieval of information from any one of a plurality of layers of a recording media comprising:

means for receiving a multi-layered recording media having information on a track on at least one of a plurality of layers;

a first adjustable electro-optical system;

first means for electro-optically positioning said first electro-optical system relative to the lateral and normal locations of the desired information;

a second adjustable electro-optical system;

means for driving said first and second adjustable electro-optical system in the desired track direction of said multi-layered recording media; and second means for electro-optically positioning, after a predetermined delay, said second adjustable electro-optical system relative to the lateral and normal locations of the desired information in response to said first means, said second adjustable electro-optical system being capable of electro-optically sensing the desired information.

18. The system as in claim 17 wherein said multi-layered recording media comprises a plurality of discs.

19. The system as in claim 17 wherein said second adjustable electro-optical system is capable of electro-optically displaying the desired information.

20. The system as in claim 17 wherein said first and second means continuously electro-optically position said first and second electro-optical system respectively.

* * * * *